US008764286B2

(12) United States Patent
Koehler et al.

(10) Patent No.: US 8,764,286 B2
(45) Date of Patent: Jul. 1, 2014

(54) SHAPE MEMORY THERMAL SENSORS

(75) Inventors: Frederick B. Koehler, Tucson, AZ (US); Ward D. Lyman, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 287 days.

(21) Appl. No.: 13/155,592

(22) Filed: Jun. 8, 2011

(65) Prior Publication Data

US 2011/0232562 A1    Sep. 29, 2011

Related U.S. Application Data

(63) Continuation-in-part of application No. 12/332,004, filed on Dec. 10, 2008, now Pat. No. 8,418,455.

(51) Int. Cl.
  *G01K 1/00*     (2006.01)
  *G01K 13/12*    (2006.01)

(52) U.S. Cl.
  USPC .......................................................... 374/100

(58) Field of Classification Search
  USPC .......................................................... 374/100
  See application file for complete search history.

(56) References Cited

U.S. PATENT DOCUMENTS

| | | | |
|---|---|---|---|
| 4,716,731 A | 1/1988 | Sakai et al. | |
| 4,839,479 A | 6/1989 | Davis, Jr. | |
| 4,899,543 A | 2/1990 | Romanelli et al. | |
| 4,945,727 A | 8/1990 | Whitehead et al. | |
| 5,061,914 A | 10/1991 | Busch et al. | |
| 5,105,178 A * | 4/1992 | Krumme .................. | 337/140 |
| 5,119,555 A | 6/1992 | Johnson | |
| 5,245,738 A | 9/1993 | Johnson | |
| 5,273,116 A | 12/1993 | Ross | |
| 5,440,193 A | 8/1995 | Barrett | |
| 5,722,709 A | 3/1998 | Lortz et al. | |
| 5,916,466 A * | 6/1999 | Dixon ........................ | 219/536 |

(Continued)

FOREIGN PATENT DOCUMENTS

| | | | | |
|---|---|---|---|---|
| JP | 04134227 A | * | 5/1992 | ............. G01K 11/00 |
| JP | 2006316830 | | 11/2006 | |
| JP | 2006316830 A | * | 11/2006 | |
| WO | WO-2010068266 A1 | | 6/2010 | |

OTHER PUBLICATIONS

"U.S. Appl. No. 12/332,004, Non Final Office Action mailed May 10, 2011", 8 pp.

(Continued)

*Primary Examiner* — Lisa Caputo
*Assistant Examiner* — Jamel Williams
(74) *Attorney, Agent, or Firm* — Schwegman, Lundberg & Woessner, P.A.

(57) ABSTRACT

Embodiments of separating apparatuses are generally described herein. Other embodiments may be described and claimed. In one embodiment, a thermal sensor assembly includes a shape memory substrate anchored within an isolation housing and braced between first and second anchors. The shape memory substrate is configured to transition from the strained configuration to the fractured configuration at a specified temperature range, and the first substrate end fractures from the second substrate end at the specified temperature. In another embodiment, a fracture indicator is coupled with the shape memory substrate, and the fracture indicator is configured to indicate the fractured configuration corresponding to meeting or exceeding of the specified temperature. In one example, the specified temperature range includes a range of temperatures or a single temperature.

24 Claims, 10 Drawing Sheets

(56) References Cited

U.S. PATENT DOCUMENTS

| | | | |
|---|---|---|---|
| 6,126,371 A * | 10/2000 | McCloskey | 411/82.5 |
| 6,247,493 B1 | 6/2001 | Henderson | |
| 6,321,654 B1 | 11/2001 | Robinson | |
| 6,352,494 B2 | 3/2002 | McAlonan | |
| 6,622,971 B1 | 9/2003 | Robertson | |
| 6,843,465 B1 | 1/2005 | Scott | |
| 6,863,447 B2 | 3/2005 | Gilleo | |
| 6,918,545 B2 | 7/2005 | Franson et al. | |
| 7,331,616 B2 | 2/2008 | Brei et al. | |
| 7,396,182 B2 | 7/2008 | Retat et al. | |
| 7,422,403 B1 | 9/2008 | Johnson et al. | |
| 7,476,224 B2 | 1/2009 | Petrakis | |
| 7,947,937 B1 | 5/2011 | Langner | |
| 8,056,335 B1 | 11/2011 | Brown | |
| 8,172,458 B2 | 5/2012 | Petrakis | |
| 8,367,151 B2 | 2/2013 | O'brien et al. | |
| 8,418,455 B2 * | 4/2013 | Lyman et al. | 60/529 |
| 2002/0127384 A1 * | 9/2002 | Mulligan et al. | 428/293.7 |
| 2002/0187020 A1 | 12/2002 | Julien | |
| 2003/0128491 A1 | 7/2003 | Bueno Ruiz et al. | |
| 2005/0136270 A1 * | 6/2005 | Besnoin et al. | 428/469 |
| 2006/0273876 A1 | 12/2006 | Pachla et al. | |
| 2008/0034750 A1 * | 2/2008 | Gao et al. | 60/527 |
| 2009/0095493 A1 | 4/2009 | Johnson et al. | |
| 2009/0314890 A1 * | 12/2009 | Koehler et al. | 244/119 |
| 2010/0117663 A1 * | 5/2010 | Herrera et al. | 324/679 |
| 2010/0139264 A1 * | 6/2010 | Lyman et al. | 60/527 |
| 2010/0215424 A1 | 8/2010 | Crookston et al. | |
| 2011/0232278 A1 * | 9/2011 | Lyman et al. | 60/527 |
| 2011/0234362 A1 * | 9/2011 | Koehler et al. | 337/290 |

OTHER PUBLICATIONS

"International Application Serial No. PCT/US2009/06471, Written Opinion mailed Mar. 11, 2010", 9 pp.

"International Application Serial No. PCT/US2009/06471, Search Report mailed Mar. 11, 2010", 3 pp.

Roberto, G., "A non-pyrotechnic mUltipoint release system for deployable telescope activated by shape memory alloy wires", Abstracts of the 55th International Astronautical Congress 2004, Vancouver, Canada. Oct. 4-8, 2004., 1 p.

"U.S. Appl. No. 12/332,004, Corrected Notice of Allowance mailed Mar. 27, 2012", 2 pp.

"U.S. Appl. No. 12/332,004, Examiner Interview Summary mailed Jan. 24, 2012", 3 pp.

"U.S. Appl. No. 12/332,004, Examiner Interview Summary mailed Aug. 10, 2012", 3 pp.

"U.S. Appl. No. 12/332,004, Final Office Action mailed Oct. 20, 2011", 9 pp.

"U.S. Appl. No. 12/332,004, Non Final Office Action mailed Apr. 6, 2012", 8 pp.

"U.S. Appl. No. 12/332,004, Notice of Allowance mailed Dec. 13, 2012", 6 pp.

"U.S. Appl. No. 12/332,004, Response filed Jan. 20, 2012 to Final Office Action mailed Oct. 20, 2012", 7 pp.

"U.S. Appl. No. 12/332,004, Response filed Aug. 2, 2012 to Non Final Office Action mailed Apr. 6, 2012", 10 pp.

"U.S. Appl. No. 12/332,004, Response filed Jul. 20, 2011 to Non Final Office Action mailed May 10, 2011", 7 pp.

U.S. Appl. No. 13/155,575, Response filed Nov. 7, 2013 to Non Final Office Action mailed Aug. 15, 2013, 17 pages.

U.S. Appl. No. 13/155,575, Non Final Office Action mailed Aug. 15, 2013, 11 pages.

U.S. Appl. No. 13/155,575, Response filed Jun. 21, 2013 to Restriction Requirement mailed May 23, 2013, 7 pages.

U.S. Appl. No. 13/155,575, Restriction Requirement mailed May 23, 2013, 10 pages.

U.S. Appl. No. 13/155,581, Final Office Action mailed Oct. 25, 2013, 31 pages.

U.S. Appl. No. 13/155,581, Non Final Office Action mailed Apr. 4, 2013, 27 pages.

U.S. Appl. No. 13/155,581, Response filed Jul. 13, 2013 to Non Final Office Action mailed Apr. 4, 2013, 23 pages.

International Application Serial No. PCT/US2009/06471, International Preliminary Report on Patentability mailed Jun. 23, 2011, 7 pages.

Braun, Simon G, "Encyclopedia of Vibration", vols. 1-3. Elsevier, (2002), 1145 -1148.

U.S. Appl. No. 13/155,575, Final Office Action mailed Dec. 26, 2013, 15 pages.

U.S. Appl. No. 13/155,581, Examiner interview Summary mailed Feb. 3, 2014, 3 pages.

U.S. Appl. No. 13/155,575, Notice of Allowance mailed Apr. 11, 2014, 11 pages.

U.S. Appl. No. 13/155,575, Response filed Mar. 25, 2014 to Final Office Action mailed Dec. 26, 2013, 13 pages.

* cited by examiner

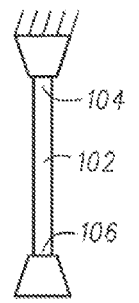
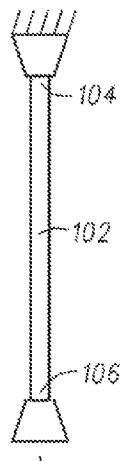
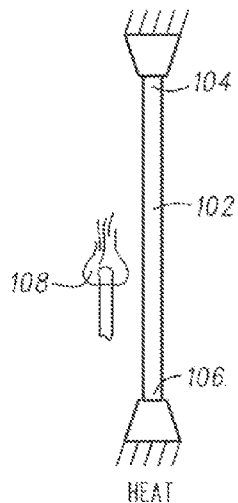
Fig. 1a   Fig. 1b   Fig. 1c   Fig. 1d
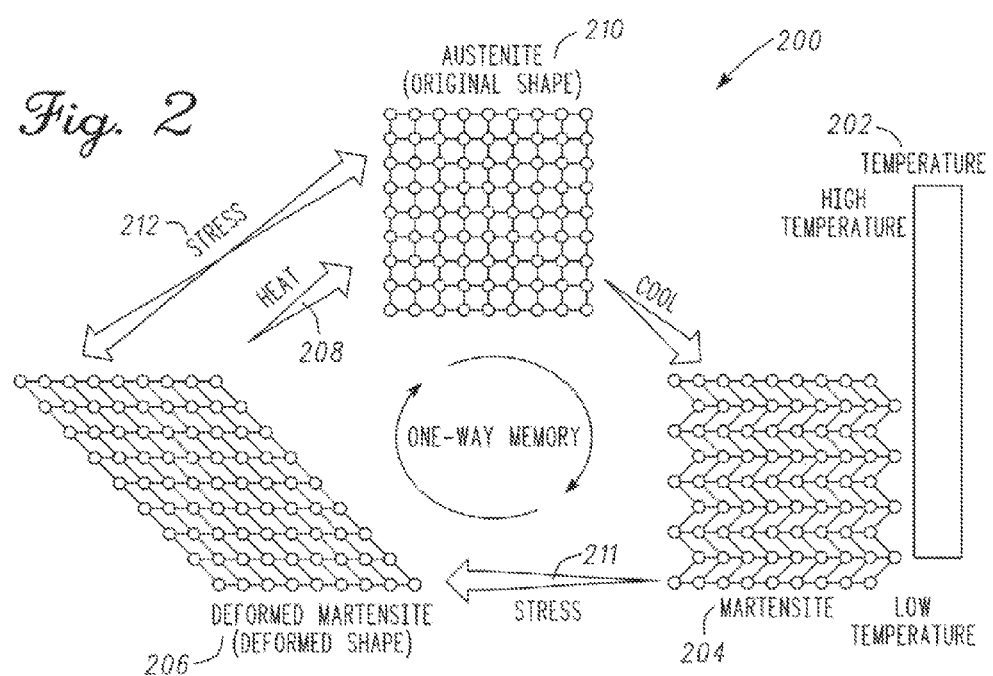
Fig. 2

SHAPE MEMORY THERMAL SENSORS

CROSS REFERENCE TO RELATED APPLICATION

This application is a continuation-in-part of commonly owned U.S. patent application Ser. No. 12/332,004, filed Dec. 10, 2008 now U.S. Pat. No. 8,418,455, and entitled, "Shape Memory Alloy Separating Apparatuses", which is incorporated herein by this reference.

FIELD

The present disclosure relates generally to shape memory alloy apparatuses. In an embodiment, the disclosure relates to actuators, coupling apparatuses and sensors formed with a shape memory alloy.

BACKGROUND

A variety of apparatuses may be used for actuating objects or holding together objects that need to be later released. For example, an explosive bolt can be used to attach two or more objects and may later release the objects with an explosive force. An explosive bolt incorporates explosives that cause an explosion when initiated or triggered. The explosion breaks apart the explosive bolt to release the objects. The problem with explosive bolts is that they are dangerous to handle because of the explosives and the explosion may exert a large amount of shock load that may damage fragile machinery. In addition, shrapnel pieces or foreign object debris (FOD) resulting from the explosion can interfere with machinery or optics.

A variety of systems include sensitive components configured to operate at or below specified temperatures. Exposure of these systems to elevated temperatures may damage components and thereby render the systems inoperable or partially inoperable. Further, in some examples storage systems are required to maintain items stored therein at or below specified temperatures. Where the storage systems fail to maintain these temperatures the items are damaged, begin to break down (e.g., where perishable) and the like.

In some examples, thermal data loggers coupled with thermal sensors (e.g., thermometers) are used to measure and store temperature data. Loggers and sensors are relatively expensive and subject to failure during operation because of the complex electronics included. Further, thermal data loggers and thermal sensors require coupling with computers to interpret and display temperature data. The supplemental computers and the like add additional cost and equipment to a system including a thermal data logger and thermal sensors.

SUMMARY

In an embodiment, a separating apparatus is provided that comprises a pre-strained member formed from a shape memory alloy. This member is configured to separate upon application of heat and the separation is configured to actuate an object.

In another embodiment, an apparatus is provided that comprises a first object, a second object, and a separating apparatus that is configured to couple the first object to the second object. In this example, the separating apparatus is formed from a shape memory alloy and is configured to separate upon application of heat.

In yet another embodiment, a separating apparatus is provided that comprises a pre-strained member configured to couple a first object to a second object. The member is formed from a shape memory alloy and is configured to separate and release the first object from the second object upon application of heat.

In still yet another embodiment, a method is provided for actuating an object that is configured to be in contact with an actuator. The actuator has a pre-strained member formed from a shape memory alloy and is configured to be in contact with the actuator. In this method, heat is applied to the member and the application of heat is configured to cause the member to separate, where the separation is configured to actuate the object.

In a further embodiment, a system and method are provided for detecting whether a specified temperature range has been met or exceeded. The system and method use a shape memory substrate configured to fracture at the specified temperature range. The shape memory substrate provides a mechanism that is readily tunable to fracture and thereby indicate meeting or exceeding of a specified temperature. For instance, the systems and methods described herein use a shape memory substrate that is tuned to change phases (and fracture when held static) according to the selection of the shape memory material, its thermal and mechanical conditioning and one or more of the stress and strain applied to the shape memory material prior to exposure to the specified temperature. The systems and methods are configured to operate at a range of temperatures (e.g., 100 to 102 degrees Celsius). Optionally, operation at a range of temperatures includes operation at a single temperature, such as 100 degrees Celsius. Stated another way, the range of specified temperatures may include only a single temperature.

The systems and methods for detecting specified temperatures provide efficient systems that avoid complex electronics, processors and the like coupled with thermal sensors and data loggers. Instead, a shape memory substrate is incorporated in a thermal sensor and is coupled with one or more of mechanical and conductive fracture indicators to detect and indicate that the systems have been exposed to temperatures that exceed the specified temperature. Moreover, the shape memory substrates provide reliable and accurate indication of meeting or exceeding the specified temperature as the shape memory substrates only fracture at or above the specified temperature. The systems and methods include in some examples features to facilitate one or more of visual and audible indications (e.g., alerts) that the specified temperature has been met or exceeded. For instance, the shape memory thermal sensors are coupled with reliable electronics (such as conductivity indicators) that provide visual or audio alerts. In another example, the shape memory thermal sensors are coupled with mechanical indicators, such as visible flags and audible mechanisms that are triggered through fracture of the shape memory substrate.

BRIEF DESCRIPTION OF DRAWINGS

The present disclosure is illustrated by way of example and not limitation in the figures of the accompanying drawings, in which like references indicate similar elements and in which:

FIGS. 1a, 1b, 1c, and 1d illustrate the use of heat to separate a separating apparatus formed from a shape memory alloy, in accordance with an embodiment of the invention;

FIG. 2 is a diagram illustrating the various solid phases of a shape memory alloy at different temperatures and stress states;

DETAILED DESCRIPTION

Figure 3:
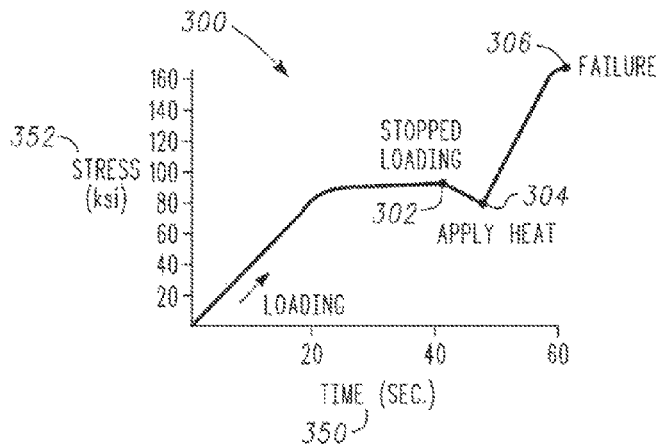
FIG. 3 illustrates a plot of the mechanical behavior of a shape memory alloy with the application of heat, in accordance with an embodiment of the invention.

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

The embodiments described herein provide a variety of separating apparatuses formed from shape memory alloys. An embodiment of the apparatus is an actuator formed from a shape memory alloy. An "actuator," as used herein, refers to an apparatus, mechanism, or mechanical device that is configured to activate or put an object, which is configured to be in contact with the actuator, into motion by imparting directly or indirectly kinetic energy to the object. Another embodiment of the apparatus is a coupling apparatus formed from a shape memory alloy. A "coupling apparatus," as used herein, refers to a mechanical device or mechanism that is configured to couple or hold together two or more objects. A fastener is an example of a coupling apparatus, which, for example, includes bolts, hooks, snaps, screws, nails, pins, rings, pins, and other fasteners. The apparatuses or portions of the apparatuses are formed from a shape memory alloy that exhibits a shape memory effect where, as described in more detail below, the shape memory alloy can be deformed and then returned to its original shape when heated.

As illustrated in FIGS. 1a-1d, this shape memory effect may be used to separate a separating apparatus. FIG. 1a illustrates a member 102 of a separating apparatus formed from a shape memory alloy, in accordance with an embodiment of the invention. As used herein, a "member" refers to a constituent part of a separating apparatus and, in the example of FIG. 1a, the member 102 is in the shape of a bar having two opposing ends 104 and 106 that, as shown in FIG. 1b, are held in place and pulled in opposite directions such that the member 102 is under strain. As illustrated in FIG. 1c, the opposing ends 104 and 106 are fixed in place and a heating source 108 applies heat to the member 102, and upon application of heat, the member 102 separates into two pieces because of the shape memory effect. As used herein, to "separate" is to come apart caused by a break or fracture in the separating apparatus. As described in more detail below, such a unique property of shape memory alloys can be used as a release mechanism for a coupling apparatus or used to actuate an object.

FIG. 2 is a representative diagram 200 illustrating the various solid phases of a shape memory alloy at different temperatures and stress states. The diagram 200 includes a temperature reference 202 identifying a temperature increasing from a low temperature at the bottom of the diagram 200 to a high temperature at the top of the diagram 200. Additionally, the diagram 200 illustrates the different solid phases or crystal structures of a shape memory alloy at temperatures identified by the temperature reference 202.

It should be appreciated that shape memory alloys undergo a temperature related phase change that is characterized by the memory of a mechanical configuration imposed on the material at an annealing temperature. When the shape memory alloy is below some lower temperature, the alloy possesses a particular crystal structure whereby it may be deformed into an arbitrary shape with relative ease. Upon heating the alloy above a higher temperature, the alloy undergoes a change in crystal structure and the shape memory effect is manifested by a resumption of the originally imparted shape, representing the onset of a restoring stress.

FIG. 2 shows a pictorial diagram illustrating the shape memory effect of an example material formed from a shape memory alloy. At a low temperature (e.g., at room temperature), the shape memory alloy is in a martensite phase 204 where the shape memory alloy has a body centered tetragonal crystal structure and may be relatively soft and deformable. When stress 211 is applied to the martensite phase 204, the shape memory alloy is deformed and transformed into a deformed martensite phase 206. For example, the shape memory alloy in the martensite phase 204 may be stretched, compressed, and/or sheared such that it takes on a deformed shape that is in a deformed martensite phase 206. In the deformed martensite phase 206, the atoms may move past each other, but the bonds are not broken, and the atoms are still relatively placed to each other in the same position as the martensite phase 204.

Upon application of heat 208 to the shape memory alloy in the deformed martensite phase 206, which results in heating the shape memory alloy to a high temperature, the shape memory alloy inherently returns to its original shape. It should be noted that the imposition of stress 211 on the shape memory alloy in the martensite phase 204 is one way and causes the deformation of the material (e.g., into the deformed martensite phase 206) that will not go back to its unstressed or pre-stressed form until heat 208 is applied. On the other hand, stress 212 imparted in the austenite phase 210, which is explained in more detail below, is a bidirectional phase change in that when the stress 212 is removed, the shape memory alloy returns back to its unstressed form (e.g., deformed shape) without the addition of heat 208.

In the original shape, the shape memory alloy is in an austenite phase 210, which has a cubic crystal structure. When cooled to a low temperature, the shape memory alloy in the austenite phase 210 transitions back to the martensite phase 204. Unlike other metals, this transition between the phases (austenite phase 210 to martensite phases 204 and 206) is reversible and repeatable. It should be appreciated that a large amount of energy is stored in the deformed martensite phase 206, and this energy used by the shape memory alloy to return to its original shape can also be used to separate the shape memory alloy. Examples of shape memory alloys that exhibit the phases illustrated in FIG. 2 include nickel-titanium alloys (e.g., Nitinol), titanium-nickel alloys, copper-zinc-aluminum alloys, copper aluminum nickel alloys, nickel titanium hafnium alloys, and other shape memory alloys.

FIG. 3 illustrates a plot 300 of the mechanical behavior of a shape memory alloy with the application of heat, in accordance with an embodiment of the invention. The plot 300 is a stress versus time curve of a shape memory alloy where the horizontal axis 350 defines time and the vertical axis 352 defines the stress applied to a shape memory alloy.

As depicted in FIG. 3, the shape memory alloy is loaded or stressed (e.g., pulled, compressed, and/or sheared) for a duration of approximately 40 seconds at a constant strain rate at which point 302 the loading is stopped. Thereafter, at point 304, heat is applied to the shape memory alloy and as a result, the shape memory alloy is further stressed because it wants to return to its original shape. With sufficient stress (e.g., at approximately 160 ksi), the shape memory alloy separates or fails at point 306 of the plot 300.

Figures 4, 5A, 5B:
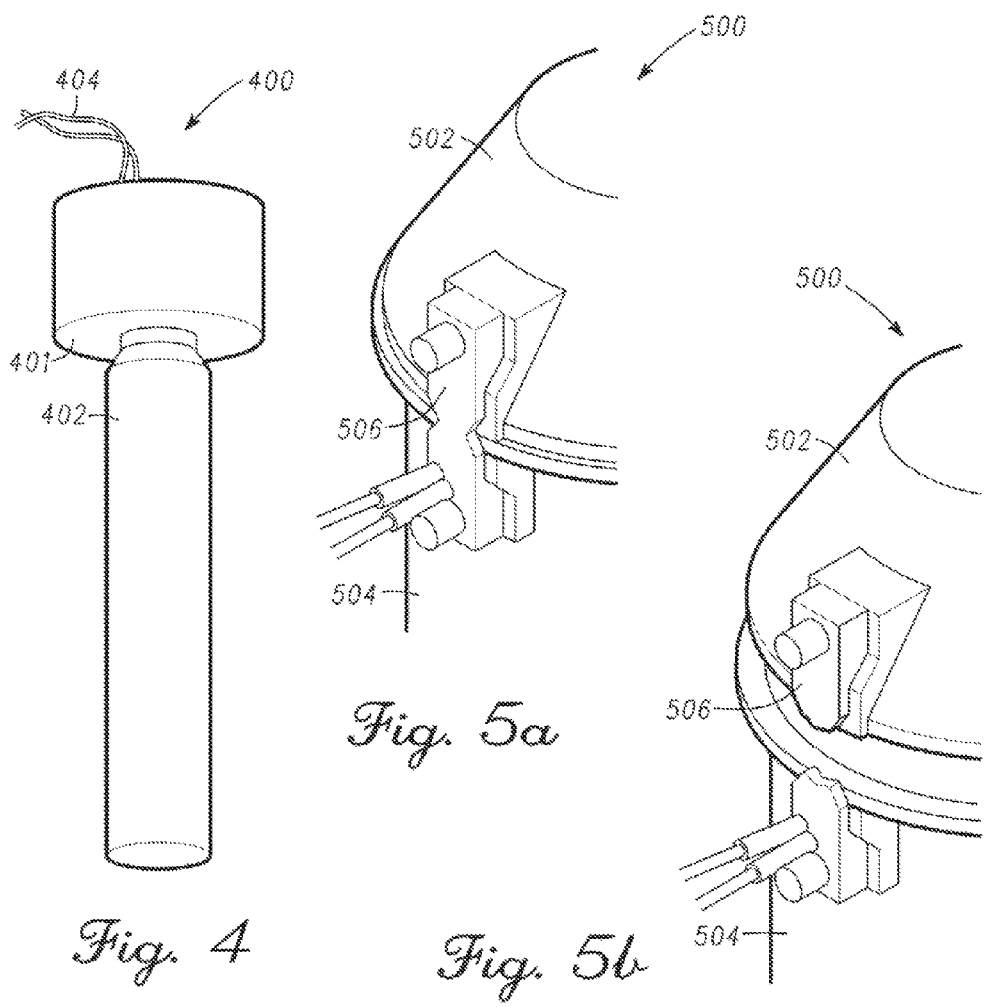
FIG. 4 illustrates an example of a separating apparatus, in accordance with an embodiment of the invention.
FIGS. 5a and 5b illustrate another embodiment of a separating apparatus used in a telescope assembly.

FIG. 4 illustrates an example of a separating apparatus, in accordance with an embodiment of the invention. The separating apparatus may be in the form of a fracturing bolt 400, which is a type of coupling apparatus, that refers to a variety of fastening rods, pins, or screws that are configured to couple two or more objects together and also configured to separate (or fracture). The fracturing bolt 400 of FIG. 4 comprises a threaded cylindrical shaft member 402 with a head member 401 attached to the cylindrical shaft member 402. Here, both the head member 401 and the cylindrical shaft member 402 are formed from a shape memory alloy. Additionally attached to the fracturing bolt 400 are electrical wires 404 (or electrical leads).

The fracturing bolt 400 is pre-strained. A separating apparatus (e.g., the fracturing bolt 400) is pre-strained when it is preloaded to a predetermined strain value. That is, a separating apparatus is pre-strained when its body or structure is deformed as a result of an applied force. The fracturing bolt 400 is pre-strained such that when heat is applied to the member 402, the member 402 is configured to separate into two pieces. In an embodiment, the heat may be generated by resistance heating, which refers to a process in which heat is generated by passing an electric current through a conductor, such as the threaded cylindrical shaft member 402. In the example of FIG. 4, an electric current may be applied to the cylindrical shaft member 402 by way of the electrical wires 404 to generate heat in the cylindrical shaft member 402. In addition to resistance heating, a variety of other techniques to generate heat may be used, in accordance with other embodiments, which is explained in more detail below.

FIGS. 5a and 5b illustrate another embodiment of a separating apparatus used in a telescope assembly 500. As depicted in FIG. 5a, a telescope assembly 500 is comprised of objects, such as a cover 502 and a housing assembly 504, that are coupled together by a separating apparatus 506 in the form of a coupling apparatus. The separating apparatus 506 is a plate with two holes at both ends of the plate that fit into pegs of the cover 502 and the housing assembly 504, which, when fitted, prevents the cover 506 from being opened or detached from the housing assembly 504.

In this example, heat may be applied to the separating apparatus 506 by resistance heating where an electric current is applied to the separating apparatus 506. As depicted in FIG. 5b, the separating apparatus 506 separates into two pieces when heated and the separation thereby releases the cover 502 from the housing assembly 504 such that the cover 502 can be opened. In another embodiment, the separating apparatus 506, as explained in more detail below, can also be an actuator configured to actuate the cover 502 when separated.

Figure 6:
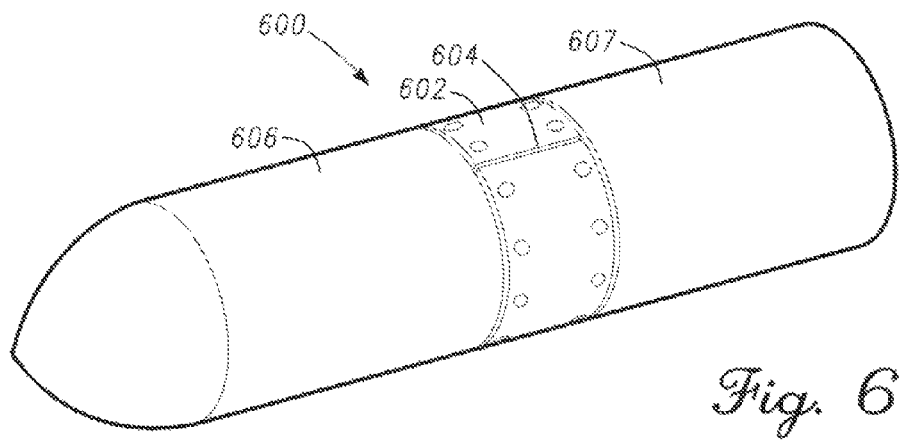
FIG. 6 illustrates yet another embodiment of a separating apparatus used in a multistage rocket.

FIG. 6 illustrates yet another embodiment of a separating apparatus 602 used in a rocket 600. The rocket 600 is a multistage rocket that comprises a first stage 606 mounted above a second stage 607 that are held together by a separating apparatus 602 in the form of a coupling apparatus. Each first stage 606 or second stage 607 contains its own engine and propellant. In effect, two rockets (first stage 606 and second stage 607) are stacked on top of each other. In this example, the separating apparatus 602 is a sleeve formed from a shape memory alloy and is configured to wrap around and couple the first stage 606 to the second stage 607.

Upon application of heat to the separating apparatus 602, the separating apparatus 602 separates to allow the first stage 606 to separate from the second stage 607. It should be noted that the location of the separation may be defined by machining a notch 604 into the separating apparatus 602 such that the separating apparatus 602 separates at the notch 604. The separating apparatus 602 illustrated in FIG. 6 may be used to replace traditional explosive mandrels with sheared rivets or traditional explosive bolts currently used to separate the first stage 606 from the second stage 607 of the rocket 600. The separating apparatus 602 has fewer parts when compared with traditional explosive mandrels and traditional explosive bolts, thereby resulting in a more reliable mechanism to allow the separation of the first stage 606 from the second stage 607.

Figure 7A:
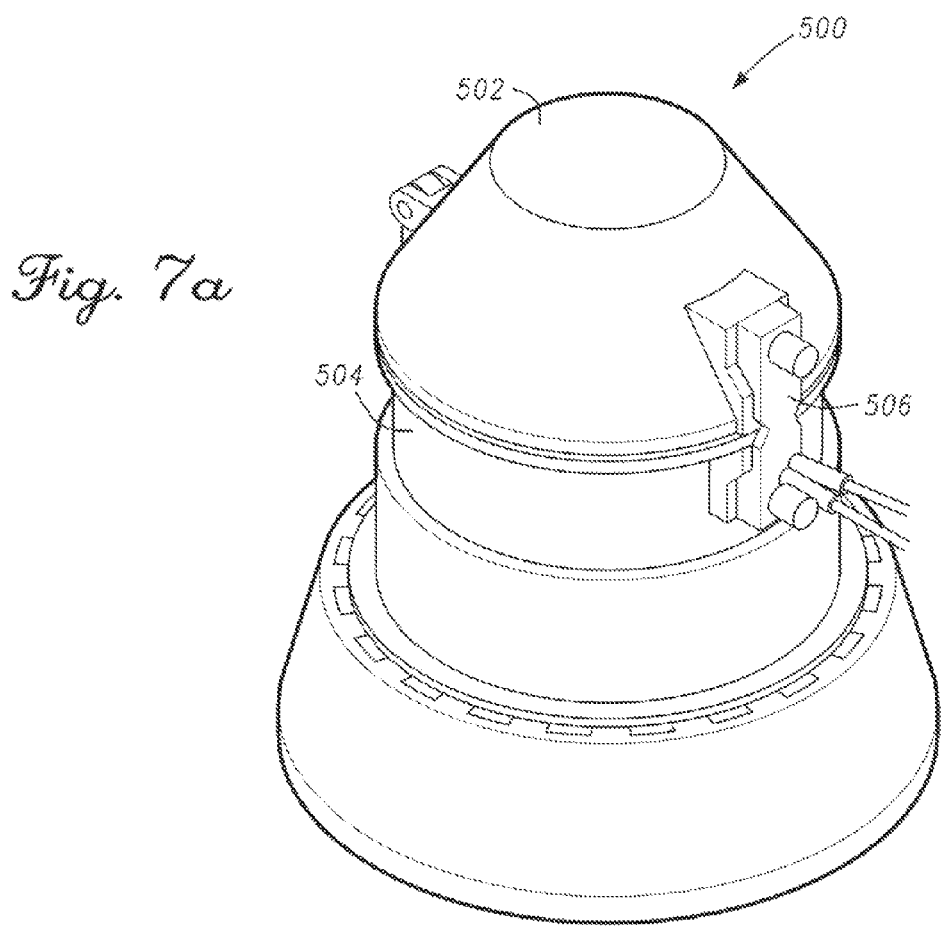
FIGS. 7a and 7b illustrate the use of a separating apparatus to actuate an object upon release, in accordance with an embodiment of the invention.
Figure 7B:
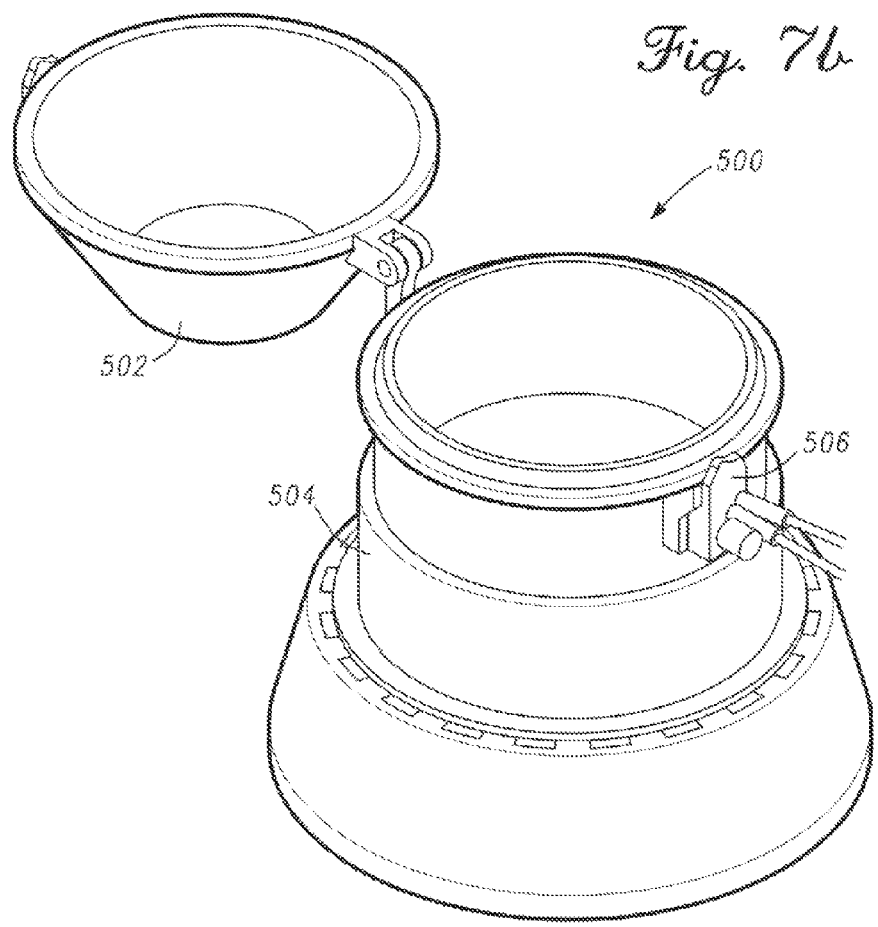

FIGS. 7a and 7b illustrate the use of a separating apparatus 506 to actuate an object upon release, in accordance with an embodiment of the invention. As illustrated in FIG. 7a and also discussed above, a telescope assembly 500 includes a cover 502 and a housing assembly 504 that are coupled together by a separating apparatus 506 formed from a shape memory alloy. In this embodiment, the separating apparatus 506 is in the form of an actuator that stores a large amount of mechanical energy that, when released, may be used to actuate an object.

For example, as illustrated in FIG. 7b, the separating apparatus 506 separates upon the application of heat, and this separation releases or imparts a large amount of kinetic energy to the cover 502 such that the energy snaps open the cover 502. As a result, in addition to releasing the cover 502 from the housing assembly 504, heat may, in effect, also be used to actuate or open the cover 502.

Figure 8:
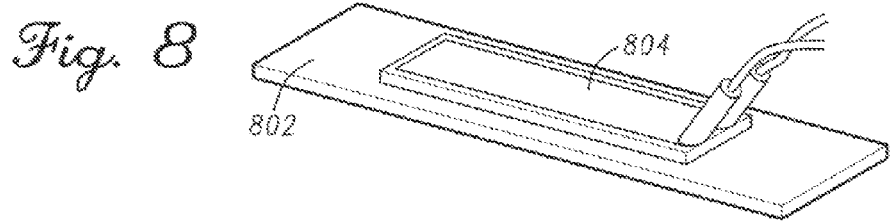
FIG. 8 illustrates an exothermic reactive foil according to an embodiment of the invention that may be used to generate heat.

FIG. 8 illustrates an exothermic reactive foil 804 according to an embodiment of the invention that may be used to generate heat. As discussed above, in addition to resistive heating, a variety of other heating techniques may be used to generate heat. For example, in an embodiment, a reactive foil 804 that may be used. In general, a reactive foil 804 is comprised of layers of metals or other materials (e.g., aluminum layers and/or nickel layers) that, when activated by an electric current, chemically react to deliver localized heat. An example of a reactive foil 804 is NANOFOIL®.

As illustrated in FIG. 8, the reactive foil 804 is attached to or deposited on a surface 802 of a separating apparatus 802 by way of, for example, a conductive adhesive. When an electric current is applied to the reactive foil 804, the electric current initiates a chemical reaction in the reactive foil 804 that results in an almost immediate, localized heating of the separating apparatus 802 that is used to separate the separating apparatus 802.

Figure 9:
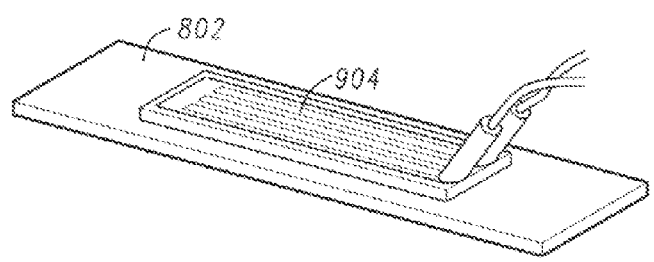
FIG. 9 illustrates resistance wires according to another embodiment of the invention that may also be used to generate heat.

FIG. 9 illustrates resistance wires 904 according to another embodiment of the invention that may also be used to generate heat. A resistance wire 904 is an electrical wire with a high electrical resistivity and is configured to generate heat upon application of an electric current. The resistance wire 904 may, for example, be formed from a nickel-chromium alloy.

As depicted in FIG. 9, resistance wires 904 are attached to a surface of the separating apparatus 802 using, for example, a conductive adhesive. When an electric current is applied to the resistance wires 904, the electric current causes the resistance wires 904 to generate heat, which is used to separate the separating apparatus 802.

Figure 10A:
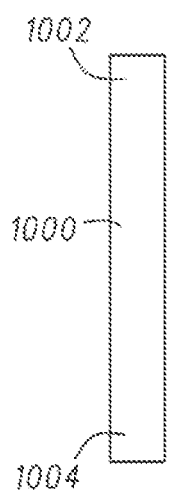
FIG. 10A illustrates one example of a shape memory substrate in an unstrained configuration.
Figure 10B:
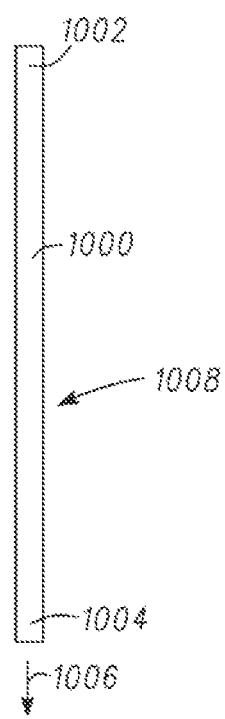
FIG. 10B illustrates the shape memory substrate of FIG. 10A in a strained configuration.

FIGS. 10A and 10B show one example of a shape memory substrate 1000 in an unstrained configuration shown (FIG. 10A) and a strained configuration 1008 (FIG. 10B). As shown in FIG. 10A, the shape memory substrate 1000 extends between first and second substrate ends 1002, 1004. The first and second substrate ends 1002, 1004 may be opposite ends of the substrate 1000. One example of the shape memory substrate 1000 is constructed with a shape memory material including, but not limited to, Nitinol, copper-zinc-aluminum alloys, copper-aluminum-nickel alloys, nickel-titanium-hafnium alloys and other shape memory materials. Further, as previously described, in one example, the shape memory substrate 1000 is provided in an initial martensitic phase. The shape memory material is in the martensitic phase after transition from an austenitic phase. For instance, the material is cooled from the austenitic phase to the martensitic phase as previously described herein. Referring now to FIG. 10B, in the martensitic phase the shape memory substrate 1000 is exposed to one or more stresses 1006. As shown in FIG. 10B, the stress 1006 is provided along a longitudinal axis of the shape memory substrate 1000 (e.g., an axis coincident to the stress 1006). The applied stress 1006 transitions the shape memory substrate 1000 into the strained configuration 1008 wherein the shape memory substrate 1000 is deflected and has a longer length than that provided in FIG. 10A. The shape memory substrate 1000 is strained from around 1 to 10 percent relative to the unstrained length of the shape memory substrate shown in FIG. 10.

As will be described in further detail below, the shape memory substrate 1000 described herein provides a reliable and accurate means for the indication of whether or not an environment surrounding the shape memory substrate 1000 has met or exceeded a specified threshold temperature. The shape memory substrate 1000, in one example, indicates meeting or exceeding of a threshold temperature according to transitions from a strained configuration such as the configuration 1008 shown in FIG. 10B to a fractured configuration as described herein. Stated another way, upon exposure of the shape memory substrate 1000 to an environmental temperature at or above a specified phase transition temperature the shape memory substrate 1000 attempts to return to the unstrained configuration shown in FIG. 10A. In one example and as described herein, the shape memory substrate 1000 is restrained from returning to the initial configuration shown in FIG. 10A and instead fractures thereby providing a clear indication that the shape memory substrate 1000 is (or was) exposed to an environmental temperature triggering the phase transition.

The shape memory substrates 1000 described herein are readily tunable to change phases according to a desired threshold temperature. For instance, the selection of shape memory materials, the thermal and mechanical conditioning of the materials and one or more of the stress and strain applied to the shape memory substrate 1000 cooperate to determine the transition temperature of the shape memory substrate 1000 (e.g., the temperature that the substrate will fracture when the first and second substrate ends 1002, 1004 are fixed in place). Tuning of the shape memory substrate 1000 to transition phases at a specified temperature provides a reliable and accurate indication of meeting or exceeding the specified threshold temperature that is readily detected by fracture indicators as described herein.

Figure 10C:
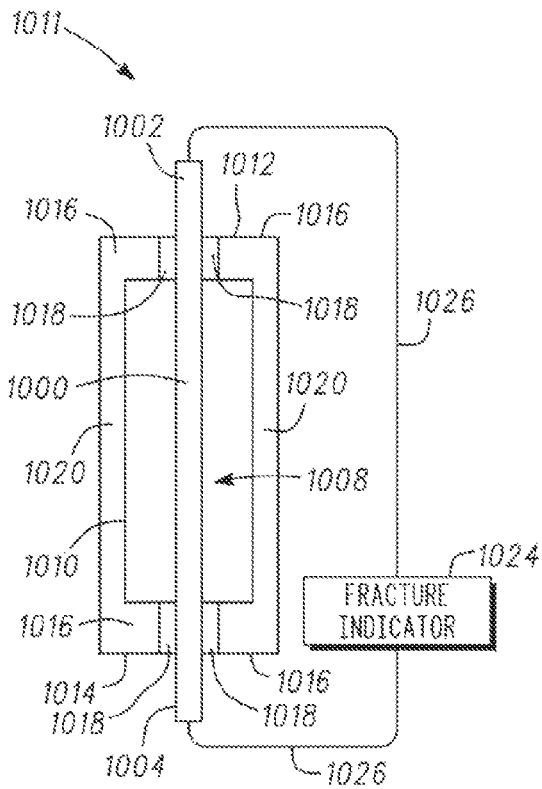
FIG. 10C illustrates a thermal sensor with the shape memory substrate of FIG. 10A in the strained configuration with a conductive fracture indicator.
Figure 10D:
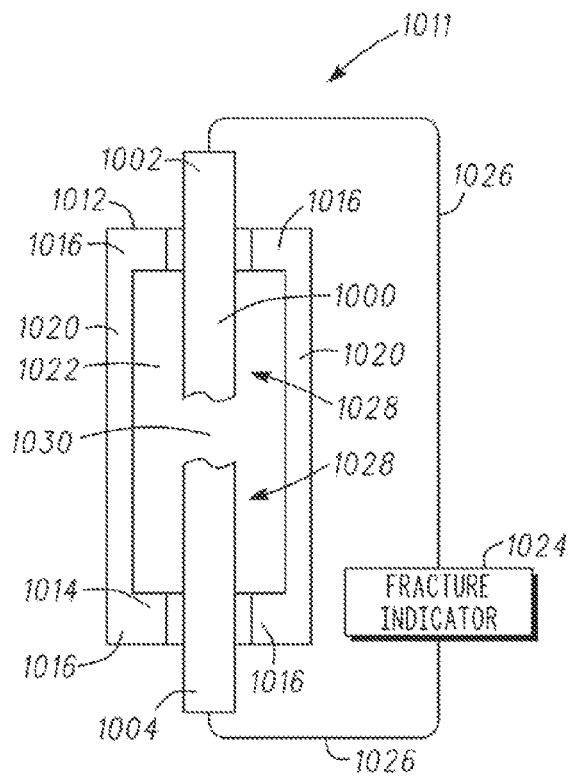
FIG. 10D illustrates the thermal sensor with the shape memory substrate of FIG. 10C in a fractured configuration.

Referring now to FIGS. 10C and 10D, one example of a thermal sensor assembly 1011 is shown. Referring first to FIG. 10C, the shape memory substrate 1000 is shown in the strained configuration 1008 provided in FIG. 10B. As shown, the shape memory substrate 1000 is anchored between first and second anchors 1012, 1014 of an isolation housing 1010. The first and second anchors 1012, 1014 cooperate to statically position the first and second substrate ends 1002, 1004 relative to one another. In one example, the first and second anchors 1012, 1014 include jaws 1016, for instance opposed jaws 1016, sized and shaped to engage with the first and second substrate ends 1002, 1004 and respectively anchor the first and second substrate ends as shown in FIG. 10C.

Optionally, insulation such as electrical insulation 1018 is interposed between the jaws 1016 and the shape memory substrate 1000 to electrically isolate the shape memory substrate from the remainder of the isolation housing 1010. In one example, the insulation 1018 is incorporated within the first and second anchors 1012, 1014 and thereby provides an insulated gripping surface for engagement with the shape memory substrate 1000. Optionally, the insulation includes insulation pads interposed between the opposed jaws 1016 and the substrate 1000. Where the insulation 1018 includes pads, surfaces and other electrically non-conductive materials the insulation 1018 is optionally incorporated as part of the first and second anchors 1012, 1014.

The thermal sensor assembly 1011 includes an isolation housing 1010 incorporating the first and second anchors 1012, 1014. The isolation housing isolates at least a portion of the strained shape memory substrate 1000 and ensures the substrate is free to transition phases when the specified temperature is met or exceeded. In one example, the isolation housing 1010 further includes braces 1020 extending between the first and second anchors 1012, 1014. The braces 1020 ensure the first and second anchors 1012, 1014 as well as the respective first and second substrate ends 1002, 1004 are positioned at static locations relative to each other throughout operation of the thermal sensor assembly 1011. Stated another way, the braces 1020 hold the first and second anchors 1012, 1014 at a set distance from each other and substantially prevent the shape memory substrate 1000 at the phase transition temperature from reverting from the strained configuration 1008 to the initial configuration shown in FIG. 10A. As described above and described in further detail below, instead the braces 1020 and first and second anchors 1012, 1014 cooperate to ensure that the shape memory substrate 1000 when exposed to a temperature at or above the transition temperature fractures as shown in FIG. 10B and further described below.

Further, the isolation housing 1010 includes an isolation cavity 1022 (e.g., a space, hole and the like) configured to allow the portion of the shape memory substrate 1000 between the first and second anchored substrate ends 1002, 1004 to extend between the first and second anchors 1012, 1014 without engagement with other features of the isolation housing 1010. Stated another way, the shape memory substrate 1000 within the isolation cavity 1022 is free to transition from the strained configuration 1008, for instance, to a fractured configuration 1028 shown in FIG. 10B without support or bracing provided by the isolation housing 1010 to interfere with the transition between the configurations.

In the example shown in FIG. 10C, the isolation housing 1010 is shown as a monolithic structure extending around and coupled with the shape memory substrate 1000. In another example, the isolation housing 1010 is incorporated within an equipment assembly, for instance, with a storage locker, a piece of electronic hardware, motorized equipment and the like. Where the isolation housing 1010 is incorporated into these devices the first and second anchors 1012, 1014 include, but are not limited to structural contacts on the equipment assembly, for instance, projections, cantilevered ridges, housing portions and the like. The first and second anchors 1012, 1014 in such an equipment assembly thereby engage with and anchor the shape memory substrate 1000 at the first and second substrate ends 1002, 1004 in a substantially similar manner to the isolation housing 1010 shown in FIG. 10C. In such an example, the braces 1020 (one or more) extending between the first and second anchors 1012, 1014 include, for instance, other portions of the equipment assembly such as the housing and the like. In a similar manner, the isolation cavity 1022 includes but is not limited to spaces between the support contacts comprising the first and second anchors 1012, 1014 without dedicated braces 1020 as shown in FIG. 10C. Stated another way, where the thermal sensor assembly 1011 is incorporated into an equipment assembly without a dedicated isolation housing 1010 the shape memory substrate 1000 including the first and second substrate ends 1002, 1004 is anchored at the first and second substrate ends 1002, 1004 with portions of the equipment assembly. The first and second substrate ends 1002, 1004 are thereafter indirectly braced, for instance, with portions of the equipment assembly such as a rocket body, a storage locker, an electronics housing and the like.

Referring again to FIG. 10C, the thermal sensor assembly 1011 is further shown with a fracture indicator 1024. In the example shown in FIG. 10C, the fracture indicator 1024 is an electrical fracture indicator, such as a conductivity sensor including leads 1026 coupled with the respective first and second substrate ends 1002, 1004 of the shape memory substrate 1000. In one example, the shape memory substrate includes a conductive material such as nickel, copper and the like and the leads 1026 complete the circuit with the fracture indicator 1024. The fracture indicator 1024 is thereby able to detect the configuration of the shape memory substrate 1000 through sensing of an open or closed circuit within the circuit created with the leads 1026, the shape memory substrate 1000 and the fracture indicator 1024.

Referring now to FIG. 10D, the thermal sensor assembly 1011 is shown in a fractured configuration 1028. That is to say, the shape memory substrate 1000 is shown in the fractured configuration 1028 and an open circuit is provided between the fracture indicator 1024, the leads 1026 and the shape memory substrate 1000 including a fracture 1030 therebetween. As previously described, when the shape memory substrate 1000 is exposed to a specified temperature the shape memory substrate 1000 is tuned to transition from the strained configuration 1008 (see FIG. 10B) to the fractured configuration 1028 shown in FIG. 10D. The shape memory substrate 1000 transitions to the fractured configuration 1028 because of the anchoring of the first and second substrate ends 1002, 1004 by the isolation housing 1010 including the first and second anchors 1012, 1014. That is to say, as the shape memory substrate 1000 is exposed to the specified temperature the substrate attempts to transition from the strained configuration 1008 to the initial configuration shown in FIG. 10A. Because of the anchoring of the first and second substrate ends 1002, 1004 the shape memory substrate instead fractures at the fracture 1030 thereby breaking the circuit otherwise completed with the shape memory substrate 1000 before fracture. As shown in FIG. 10D, the fracture 1030 provides a significant gap between the first and second substrate ends 1002, 1004 because the shape memory substrate continues to tension toward the unstrained configuration shown in FIG. 10A after the circuit is opened. The fractured shape memory substrate 1000 thereby substantially prevents the completing (or arcing) of the circuit.

In one example, the shape memory substrate 1000 includes a fracture locus positioned between the first and second substrate ends 1002, 1004 as well as the first and second anchors 1012, 1014. In one example, the fracture locus includes a decrease in cross sectional area of the shape memory substrate 1000 somewhere between the first and second anchors 1012, 1014. For instance, the fracture locus includes a notch formed in the shape memory substrate 1000, for instance by cutting, molding, coining and the like. In another example, the fracture locus includes a weakened portion of the substrate 1000 between the first and second anchors 1012, 1014. For instance, the fracture locus includes a fatigued portion of the substrate 1000. The inclusion of a fracture locus between the first and second anchors 1012, 1014 ensures the shape memory substrate 1000 fractures between the first and second anchor ends 1002, 1004 and does not partially or fully fracture at the anchors. Additionally, the fracture locus ensures the fracture 1030 occurs at a specified location on the shape memory substrate 1000, for instance, at the intersection with a detonation cord or mechanical flag (both described below).

Optionally, the shape memory substrate 1000 is configured to operate at a range of temperatures (e.g., 100 to 102 degrees Celsius, or higher or lower ranges and temperatures). Optionally, operation at a range of temperatures includes operation at a single temperature, such as 100 degrees Celsius. Stated another way, the range of specified temperatures the shape memory substrate 1000 transitions from the strained to the fractured configurations may include only a single temperature.

The fracture indicator 1024 (e.g., an electrical open and closed circuit indicator) detects the change from the closed circuit as shown in FIG. 10C to the open circuit shown in FIG. 10D and thereafter provides an indication of the status of the shape memory substrate 1000. For instance, in one example the fracture indicator 1024 provides a visible indication of the fracture of the shape memory substrate 1000 such as an alert provided on a display, flashing light and the like. In another example, the fracture indicator 1004 provides an audible indication of the fracture of the shape memory substrate 1000. The fracture indicator 1024 of the thermal sensor assembly 1011 is thereby configured to indicate the shape memory substrate 1000 has been exposed to a temperature at or above the specified phase transition temperature. The fracture indicator 1024 as well as the shape memory substrate 1000 and the isolation housing 1010 thereby provide a reliable and accurate mechanism for sensing whether an environment has been at or above a specified temperature corresponding to the phase transition temperature of the shape memory substrate 1000. Complicated electronics and the relaying of information such as temperature data between a sensor and a temperature logging device and the like are thereby substantially prevented. Instead, the thermal sensor assembly 1011 provides a reliable system that detects the fracture of the shape memory substrate 1000 by monitoring a change from a closed circuit (e.g., the strained configuration 1008 shown FIG. 10C) to an open circuit (shown with the fractured configuration 1028 of FIG. 10D).

Figure 11A:
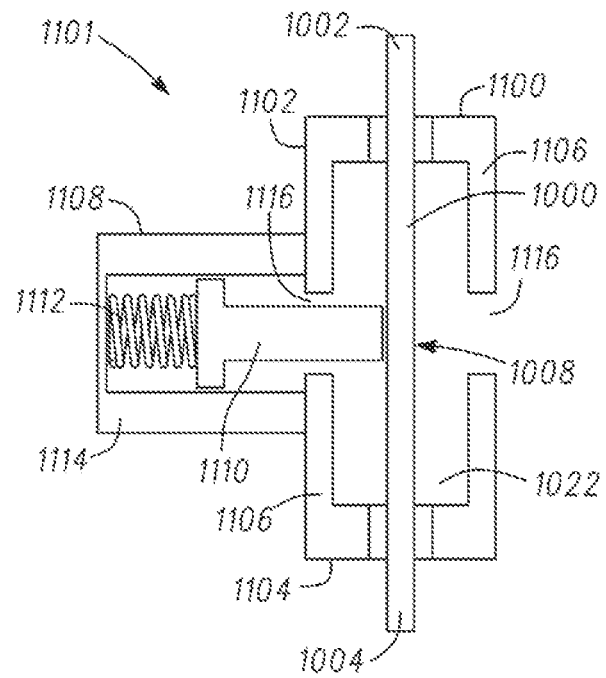
FIG. 11A illustrates a thermal sensor with the shape memory substrate of FIG. 10B in a strained configuration with a mechanical fracture indicator.
Figure 11B:
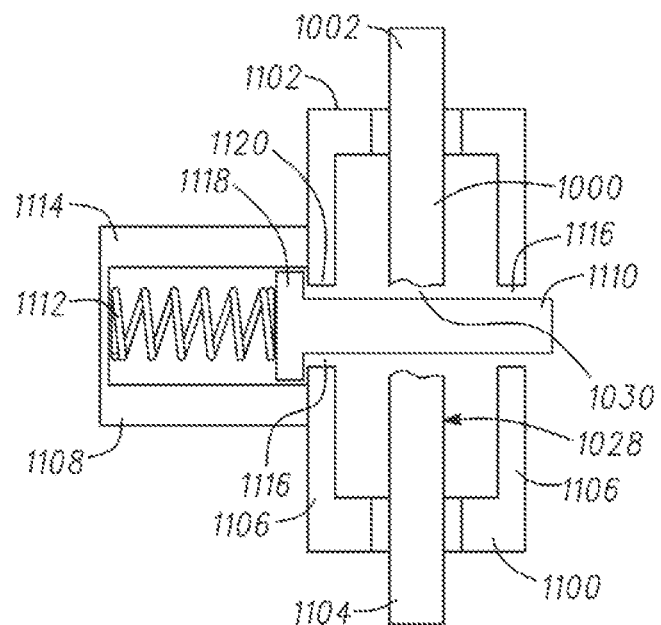
FIG. 11B illustrates the thermal sensor with the shape memory substrate of FIG. 11A in a fractured configuration.

FIGS. 11A and 11B show another example of a thermal sensor assembly 1101 including a fracture indicator 1108, for instance, a mechanical fracture indicator. The thermal sensor assembly 1101 includes similar features to the thermal sensor assembly 1011 previously shown in FIGS. 10C and 10D. For instance, the thermal sensor assembly 1101 includes the shape memory substrate 1000 in a strained configuration 1008 as shown in FIG. 11A. Additionally, the shape memory substrate 1000 is anchored within an isolation housing 1100 at first and second substrate ends 1002, 1004. As shown, the shape memory substrate 1000 extends between the first and second anchors 1102, 1104 according to braces 1106 extending therebetween. As previously described, the shape memory substrate 1000 in the strained configuration is configured to fracture at a transition temperature (e.g., a specified temperature) and thereby provide an indication through the fracture indicator 1108 that the thermal sensor 1101 has been exposed to an environment at or above the specified temperature.

Referring again to FIG. 11A, the fracture indicator 1108 is shown at one side of the isolation housing 1100. In one example, the fracture indicator 1108 forms a part of the isolation housing 1100. For instance, the indicator housing 1114 extends away from (e.g., is coupled with or integral to) the isolation housing 1100. The indicator housing 1114 includes a flag 1110 positioned therein. The flag 1110 is biased by a biasing element 1112. In one example, the biasing element 1112 includes, but is not limited to, a spring, an elastomeric material and the like positioned between the indicator housing 1114 and the flag 1110. As shown in FIG. 11A, the flag 1110 is in a stored and undeployed configuration where the flag 1110 is prevented from moving into a deployed configuration by the shape memory substrate 1000. Further, in the example shown in FIG. 11A, the isolation housing 1100 includes flag openings 1116 extending through the braces 1106 (e.g., holes). Where the shape memory substrate 1000 is in the strained configuration 1008 and before fracture the shape memory substrate 1000 is interposed between at least one of the flag openings 1116 and the flag 1110 thereby preventing the visible deployment of the flag 1110.

Referring now to FIG. 11B, the thermal sensor assembly 1101 originally described and shown in FIG. 11A, is shown in a deployed configuration with the shape memory substrate 1128 in a fractured configuration. As shown, the shape memory substrate 1000 is fractured at a fracture 1030 between the first and second substrate ends 1002, 1004 at or above the specified temperature (e.g., as the shape memory substrate attempts to transition to the initial configuration shown in FIG. 10A). Fracturing the shape memory substrate 1000 provides a passage through the isolation housing 1100 allowing the unrestrained movement of the flag 1110. As shown in FIG. 11B, the biasing element 1112 engaged with the flag 1110 biases the flag to the deployed configuration shown in FIG. 11B. The flag 1110 deploys through the fracture 1130 as well as one of the flag openings 1116 into the visible configuration shown in FIG. 11B.

In one example, the flag 1110 includes a flag flange 1118 sized and shaped for engagement with a corresponding isolation housing flange 1120. The engagement of the flanges 1118, 1120 substantially arrests further motion of the flag 1110 and allows the flag 1110 to visibly present itself from the isolation housing 1100 without decoupling and falling away from the thermal sensor assembly 1101. The thermal sensor assembly 1101 is thereby substantially contained within the isolation housing 1100 and does not create flying object debris (FOD) within an equipment assembly the thermal sensor assembly 1101 is positioned within.

In one example, the flag 1110 presents itself from the isolation housing 1100 thereby providing visual indication that the thermal sensor assembly 1101 has been exposed to a temperature at or above a specified transition temperature for the shape memory substrate 1000. In the example shown in FIG. 11B, the flag 1110 provides the visible indication to thereby alert a user the thermal sensor assembly 1101 has experienced such a temperature condition. In another example, the violent engagement between the flag 1110 and the isolation housing 1100, for instance, at the flag flange 1118 and the isolation housing flange 1120 provides an audible indication to persons near the thermal sensor assembly 1101 at the time the shape memory substrate 1000 is exposed to the specified temperature. In another example, the thermal sensor assembly 1101 provides a combination of visible indication through the flat 1110 as well as an audible indication of meeting or exceeding the specified temperature through the violent engagement of the flag 1110 with the isolation housing 1100 as described herein.

Figure 12:
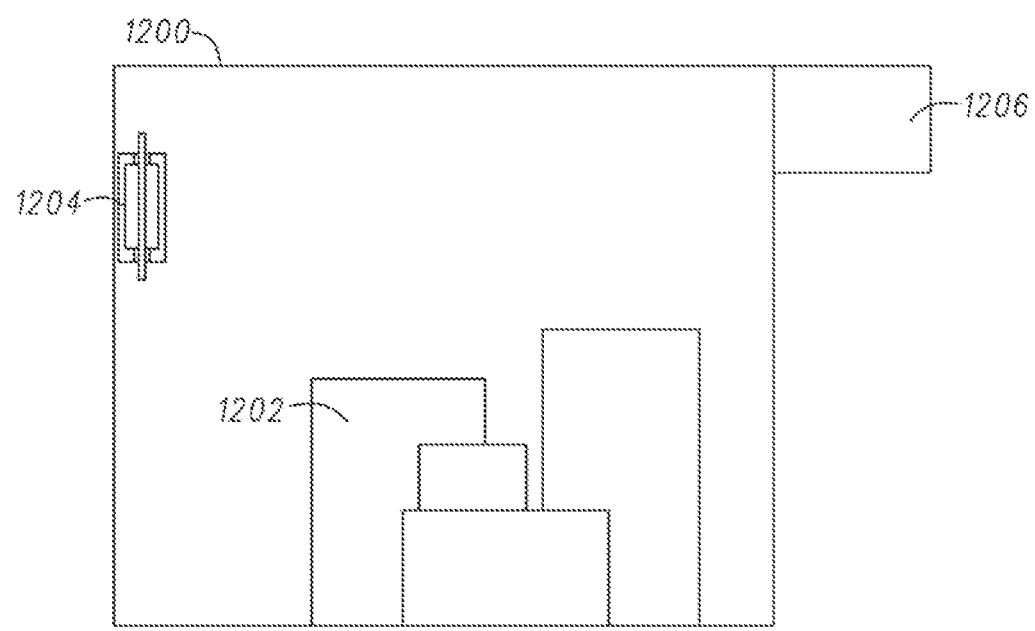
FIG. 12 illustrates a thermal sensor including a shape memory ally in storage container.

FIG. 12 shows one example of an equipment assembly including a storage container 1200 having the thermal sensor assembly 1204 disposed therein. In one example, the storage container 1200 includes but is not limited to an equipment assembly such as a storage locker, a packing crate, a refrigerated cabin and the like. As shown in FIG. 12, one or more stored items 1202 are positioned within the storage container 1200. In one example, the stored items 1202 are stored in the storage container 1200 at or below a specified temperature (e.g., 34 degrees for perishable food items). The storage container 1200 includes in another example a heat exchange system 1206, such as a refrigerant assembly configured to refrigerate the environment within the storage container 1200 and thereby maintain the stored items 1202 at the specified temperature.

As shown in FIG. 12, the thermal sensor assembly 1204 is configured in a substantially similar manner to one or more of the thermal sensor assemblies 1011, 1101 shown in FIGS. 10A-11B. For instance, the thermal sensor assembly 1204 includes a shape memory substrate 1000 in a strained configuration 1008. In one example, the shape memory substrate 1000 is held within an isolation housing such as the isolation housing 1010 shown in FIGS. 10C and 10D. In yet another example, the thermal sensor assembly 1204 includes a fracture indicator such as the conductive fracture indicator 1024 shown in FIGS. 10B, C or the mechanical fracture indicator 1108 shown in FIGS. 11A and 11B.

As previously described, the shape memory substrate 1000 is positioned within the thermal sensor assembly 1204 in a strained configuration such as the strained configuration 1008 shown in FIG. 10B. The shape memory substrate 1000 is configured to transition to the initial configuration shown in FIG. 10A when the environment within the storage container 1200 meets or exceeds a specified temperature, for instance, a threshold temperature, the stored items 1202 must be stored below to preserve the items. As previously described one or more of the shape memory substrate 1000 material, thickness, strain and the like are configured to ensure the shape memory substrate 1000 changes phase and fractures when positioned within the isolation housing such as the isolation housing 1010, 1100 shown in FIGS. 10C-11B. That is to say, the specified transition temperature for the shape memory substrate is chosen to equate with a temperature that exceeds the desired storage temperature for the stored items 1202.

In operation, the thermal sensor assembly 1204 operates in a substantially passive manner within the storage container 1200 until such time as a temperature within the storage container 1200 meets or exceeds a specified temperature causing transition of the shape memory assembly substrate 1000 into a fractured configuration shown in FIGS. 10B and 11B. Upon fracture of the shape memory substrate 1000 one or more of the fracture indicators 1024, 1108 indicates that the temperature within the storage container 1200 has at least once exceeded the specified temperature. In one example, where the thermal sensor assembly 1204 includes a conductive fracture indicator 1024 (see FIGS. 10C, 10D) the fracture indicator 1024 provides notification of meeting or exceeding the specified temperature through visual or audible means. For instance, the fracture indicator 1024 is coupled with a monitor, indication light, radio transmitter and the like to provide some indication that the shape memory substrate 1000 is fractured and the temperature within the storage container 1200 has thereby been met or exceeded. In another example, the conductive fracture indicator 1024 provides an audible indication such as an alarm, a recognizable noise, a transmitted signal to a speaker system and the like indicating that the temperature within the storage container 1200 has met or exceeded the specified temperature, the shape memory substrate 1000 is configured to fracture at.

In another example, where the thermal sensor assembly 1204 includes the fracture indicator 1108 as shown in FIG. 11B the indicator 1108 presents a visible flag 1110 that alerts an observer that the temperature within the storage container 1200 has met or exceeded the specified temperature. In another example, triggering of the flag 1110 in another example provides an audible indication as the flag 1110 violently strikes a portion of the isolation housing 1100 to provide an audible noise indicative of meeting or exceeding the specified temperature.

Figure 13:
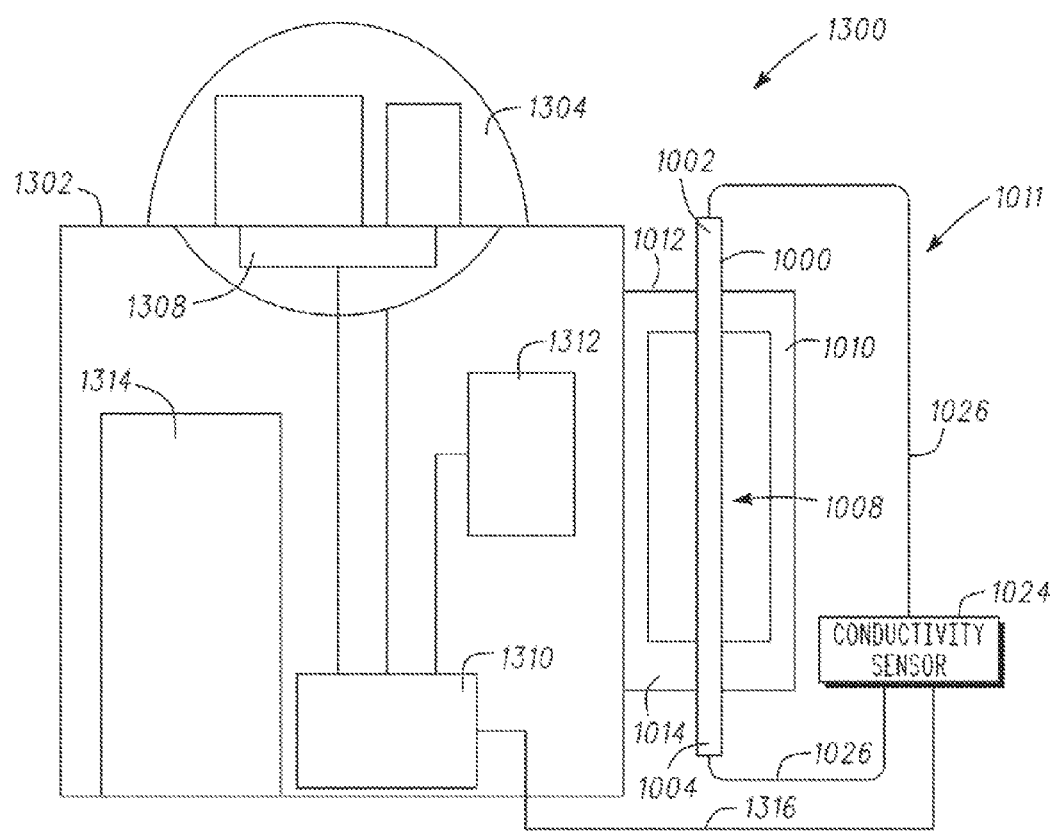
FIG. 13 illustrates a thermal sensor coupled with an optical system.

FIG. 13 shows another example of an equipment assembly including an optical assembly 1300. As shown in FIG. 13, the optical assembly 1300 includes an optical housing 1302 having an optics module 1304 provided thereon. In one example, the optics module 1304 includes one or more instruments configured to sense and detect various visible phenomena. As further shown in FIG. 13, the optical assembly 1300 includes an actuator 1306 configured to actuate the optics module 1304 into whatever orientation is necessary for operation of the module. Additionally, the optical assembly 1300 further includes a sensor 1308 coupled with the optics module 1304 to assess and interpret data received from the instruments within the optics module 1304. In yet another example, the optical assembly 1300 includes a processor 1310 in communication with one or more of the sensor 1308 and the actuator 1306. The processor 1310 includes, but is not limited to, a CPU, circuit board, semiconductor, a plurality of semiconductors and the like configured to control the operation of the optical assembly 1300, cooperate with a storage module 1312, and relay information from the optical assembly 1300 to other systems, for instance, systems within aircraft, rockets, missiles, vehicles and the like.

Referring again to FIG. 13, in one example, the optical assembly 1300 includes a thermo-electric cooler 1314 sized and shaped to cool the optical assembly 1300 during operation. In one example, the optical assembly 1300 operates at an elevated temperature and operation of the thermo-electric cooler 1314 is required to cool the components of the optical assembly and ensure the components do not overheat, become damaged and thereby become inoperable or partially inoperable. In some examples, damaging components within the optical assembly 1300 ruins the entire optical assembly 1300 and requires expensive repair and/or replacement of the optical assembly or components of the optical assembly. Sensing of a failure within the thermoelectric cooler 1314, for instance by detection of temperature spikes with the thermal sensor assembly 1011, facilitates arresting of operation of the optical assembly 1300 until necessary repairs to the thermo-electric cooler 1314 are made and the optical assembly 1300 may once again enter into service. Damage of sensitive and expensive components and corresponding replacement of the same is thereby avoided.

One example of a thermal sensor assembly 1011 (previously shown in FIGS. 10C and 10D) is coupled with the optical assembly 1300. As previously described, the thermal sensor assembly 1011 includes, but is not limited to, a shape memory substrate 1000 in a strained configuration 1008 positioned within an isolation housing 1010. The shape memory substrate 1000 is anchored between first and second anchors 1012, 1014 that substantially fix the opposed ends 1002, 1004 of the shape memory substrate 1000 within the isolation housing 1010. As further shown in FIG. 13, the thermal sensor assembly 1011 further includes a fracture indicator such as a conductivity sensor 1024 coupled between the first and second substrate ends 1002, 1004 by leads 1026. As previously described herein, the fracture indicator 1024 is configured to detect the opening of the circuit formed by the leads 1026 and the shape memory substrate 1000. For instance, where the thermoelectric cooler 1314 fails and the optical assembly 1300 begins to operate at an elevated temperature beyond a specified threshold temperature (below which it is safe to operate the optical assembly 1300) the shape memory assembly 1000 is configured to change phases and fractures as shown in FIG. 10D. The opening of the circuit detectable by the conductivity sensor 1024 provides an indication that the specified temperature has been met or exceeded and operation of the optical assembly 1300 should be discontinued. In the example shown in FIG. 13A a sensor interconnect 1316 is coupled with the processor 1310. Upon sensing an open circuit with the fracture indicator 1024 the processor 1310 operates to shut down the optical assembly 1300. In another example, the processor 1310 provides notification visually, audibly by data transmission and the like that the thermo-electric cooler 1314 has failed and thereafter requests maintenance of the thermo-electric cooler 1314 before operation of the optical assembly 1300 may be resumed.

In still another example, a mechanical thermal sensor assembly is coupled with the optical assembly 1300. For instance, the thermal sensor assembly 1101 is coupled with the optical assembly 1300. In one example, the flag 1110 shown in FIGS. 11A and 11B includes a knife like feature on the flag 1110 configured to sever a wire within a closed circuit. Severing of the wire opens the circuit and thereby notifies the processor 1310 that the optical assembly 1300 is operating at a temperature at or above the specified operation temperature. In a similar manner to the previously described example with the thermal sensor assembly 1011, the processor 1310 thereafter shuts down the optical assembly 1300 and provides an indication that the thermoelectric cooler 1314 has failed and maintenance is required before the optical assembly 1300 may be operated again.

By coupling one or more of the thermal sensors assemblies 1011, 1101 with the optical assembly 1300 the optical assembly 1300 can be reliably operated in substantially any environment until such time the thermo-electric cooler 1314 fails. The thermal sensor assembly 1101 and thermal sensor assembly 1011 provide reliable mechanisms to detect operational temperatures at or above a specified safe operation temperature. The thermal sensor assembly thereby ensures the optical assembly 1300 discontinues operation and maintains the optics module 1304, sensor 1308 and other sensitive components in working order until such time as the thermo-electric cooler 1314 may be repaired and operation resumed. The expensive and sensitive components of the optical assembly 1300 are thereby maintained over the operational lifetime of the optical assembly 1300 despite possible failures of the thermo-electric cooler 1314. Stated another way, overheating of the optical assembly 1300 is substantially prevented through operation of the thermal sensor assembly described herein coupled with the optical assembly 1300.

Figure 14:
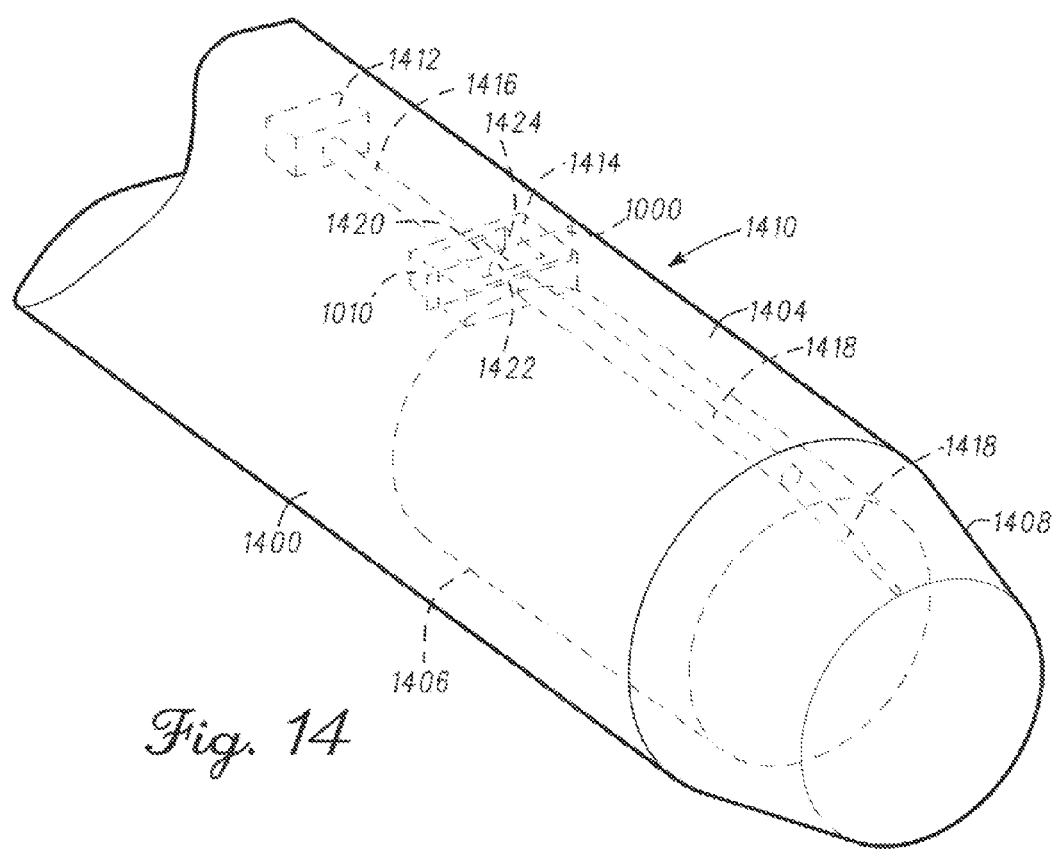
FIG. 14 illustrates a thermal sensor coupled with a missile system.

FIG. 14 shows another example of an equipment assembly including a rocket motor 1400. As shown in FIG. 14, the rocket motor 1400 includes a motor housing 1402 having a housing wall 1404 extending around a rocket propellant 1406 therein. The rocket motor 1400 further includes a rocket nozzle 1408 in communication with the rocket propellant 1406. The rocket nozzle 1408 is configured to direct and discharge exhaust gases created by the consumption of the rocket propellant 1406 within the rocket motor 1400. The motor housing 1402 is configured to retain exhaust gases therein in a pressurized environment for discharge at high velocities to propel a rocket including the motor 1400.

In the example shown in FIG. 14, the rocket motor 1400 incorporates a venting system 1410 (e.g., an equipment assembly incorporating a thermal sensor assembly). The venting system 1410 is configured to open the motor housing 1402 and prematurely exhaust gases created by the rocket propellant 1406 where the rocket motor 1400 is unintentionally initiated or there is a risk that the rocket motor 1400 will be initiated before it is desirable to do so. Stated another way, the venting system 1410 provides a mechanism to make the rocket motor 1400 a munition that is insensitive to unintended events that would otherwise initiate operation of the motor. The venting system is entirely contained within the rocket motor 1400, for instance the housing wall, in another example to provide an aerodynamic profile for the motor housing 1402.

As shown, the venting system 1410 includes a temperature sensor 1412 and a shape memory interrupter 1414. A low energy detonation cord 1416 extends between the temperature sensor 1412 and the shape memory interrupter 1414. Additionally, a high energy detonation cord 1418 extends along a portion of the motor housing 1402, for instance, along the rocket propellant 1406. As shown in FIG. 14 for example, the high energy detonation cord 1418 in one example extends the length of the rocket propellant 1406 to the rocket nozzle 1408. The high energy detonation cord 1418 is in one example positioned within the housing wall 1404 and sized and shaped to split the housing wall 1404 once detonated. In another example, one or more of the low energy and high energy detonation cords 1416, 1418 are positioned along one or more of the exterior or interior surface of the housing wall 1404. Detonation of the high energy detonation cord 1418 opens the motor housing 1402 and allows for the safe and low pressure exhausting of exhaust gases from the motor housing 1402 upon initiation or possible initiation of the rocket propellant 1406.

Referring again to FIG. 14, the venting system 1410 as previously described includes low energy and high energy detonation cords 1416, 1418. At the shape memory interrupter 1414, the low energy detonation cord end 1420 meets the high energy detonation cord end 1422 at a detonation cord interface 1424. As shown, the shape memory substrate 1000 extends across the low energy and high energy detonation cord ends 1420, 1422 and interrupts the transition from the low energy detonation cord 1416 to the high energy detonation cord 1418. In one example, the shape memory substrate 1000 is configured to a fracture at a specified temperature and thereby open the shape memory interrupter 1414 and allow the low energy detonation cord 1416 to ignite the high energy detonation cord 1418 and facilitate the operation of the venting system 1410 to split open the housing wall 1404 and thereby vent exhaust gases from the motor housing 1402.

In operation, the venting system 1410 operates according to detected thermal events around the rocket motor 1400. For instance, the thermal sensor (e.g., a thermal temperature sensor) 1412 detects a rise in temperature above a specified threshold. In one example, the specified threshold temperature is a temperature capable of igniting the rocket propellant 1406 and causing an undesired ignition of the propellant. Triggering of the thermal sensor 1412 correspondingly ignites the low energy detonation cord 1416 (e.g., through a mechanism in the thermal sensor). The low energy detonation cord 1416 ignites along the motor housing 1402 toward the shape memory interrupter 1414 and the detonation cord interface 1424 therein. The shape memory substrate 1000 within the shape memory interrupter 1414 provides a redundant failsafe device configured to operate at an identical specified temperature to the temperate sensor 1412. Stated another way, where the shape memory substrate 1000 is exposed to a temperature meeting or exceeding the specified threshold temperature of the temperature sensor 1412 the shape member substrate 1000 fractures as previously described herein. Fracture of the shape memory substrate 1000 allows the ignition of the lower energy detonation cord 1416 to pass to the high energy detonation cord 1418 (e.g., across the detonation cord interface 1424) and allows the high energy detonation cord 1418 to split the housing wall 1404. Splitting of the housing wall 1404 allows any exhaust gases generated within the motor housing 1402 to harmlessly exit from the rocket motor 1400. Stated another way, where the thermal sensor 1412 detects a temperature spike and the shape memory interrupter 1414 experiences the same temperature the venting system 1410 operates through ignition of the high energy detonation cord 1418 and corresponding splitting of the housing wall 1404.

In another example, where a localized temperature of the thermal sensor 1412 meets or exceeds the specified temperature but the temperature at the shape memory substrate 1000 of the shape memory interrupter 1414 does not similarly meet that temperature, the shape memory substrate 1000 interrupts the ignition path of the low and high energy detonation cords 1416, 1418 and thereby substantially prevents operation of the venting system 1410 from localized temperature spikes that are not a risk to the rocket propellant 1406. The motor housing 1402 is thereby substantially maintained and requires only the replacement of the low energy detonation cord 1416 because the low energy detonation cord 1416 is unable to cause significant damage to the motor housing 1402.

In still another example, the temperature sensor 1412 experiences a voltage spike, electronic failure and the like. The faulty temperature sensor 1412 may ignite the low energy detonation cord 1416 in error. Provision of the shape memory interrupter 1414 substantially prevents the unintended operation including splitting of the motor housing 1402 by the high energy detonation 1418. That is to say, the shape memory substrate 1000 interrupts the ignition path of the low and high energy detonation cords 1416, 1418 and thereby ensures that the motor housing 1402 is maintained while only replacement of the low energy detonation cord 1416 is otherwise required. Stated another way, the shape memory interrupter 1414 in such an example operates as a failsafe device and substantially prevents damage to the rocket motor 1400 where the temperature sensor 1412 fails because of a voltage spike, equipment failure, and the like.

In yet another example, the temperature sensor 1412 includes a shape memory substrate, as previously described herein. The temperature sensor 1412 including the shape memory substrate is configured to transition from the strained to the fractured configuration at the specified temperature (or range of temperatures). For instance, the transition to the fractured configuration opens a circuit, and detection of the open circuit (e.g., by fracture indicator 1024) operates an igniter that ignites the low energy detonation cord 1416. Optionally, the temperature sensor includes a mechanical fracture indicator 1108, and operation of the mechanical actuator actuates a switch (e.g., with the mechanical flag 1110) that correspondingly ignites the low energy detonation cord 1416.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the invention may lie in less than all features of a single disclosed embodiment. Thus the following claims are hereby incorporated into the detailed description, with each claim standing on its own as a separate preferred embodiment.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

CONCLUSION

A system and method are provided for detecting whether a specified temperature has been met or exceeded. The system and method use a shape memory substrate configured to fracture at the specified temperature. The shape memory substrate provides a mechanism that is readily tunable to fracture and thereby indicate meeting or exceeding of a specified temperature. For instance, the systems and methods described herein use a shape memory substrate that is tuned to change phases (and fracture when held static) according to the selection of the shape memory material, its thickness and width and the strain applied to the shape memory material prior to exposure to the specified temperature.

The systems and methods for detecting specified temperatures provide efficient systems that avoid complex electronics, processors and the like coupled with thermal sensors and data loggers. Instead, a shape memory substrate is incorporated in a thermal sensor and is coupled with one or more of mechanical and conductive fracture indicators to detect and indicate that the systems have been exposed to temperatures that exceed the specified temperature. Moreover, the shape memory substrates provide reliable and accurate indication of meeting or exceeding a specified temperature as the shape memory substrates only fracture at or above the specified temperature. The systems and methods include in some examples features to facilitate one or more of visual and audible indications (e.g., alerts) that the specified temperature has been met or exceeded. For instance, the shape memory thermal sensors are coupled with reliable electronics (such as conductivity indicators) that provide visual or audio alerts. In another example, the shape memory thermal sensors are coupled with mechanical indicators, such as visible flags and audible mechanisms that are triggered through fracture of the shape memory substrate.

What is claimed is:

1. A thermal sensor assembly comprising:
   a shape memory substrate including first and second substrate ends;
   an isolation housing coupled with the shape memory substrate, the isolation housing includes:
      a first anchor coupled near the first substrate end,
      a second anchor coupled near the second substrate end, and
      a brace extending between the first and second anchors, the brace statically positions the first and second anchors and the respective first and second substrate ends;
   wherein the shape memory substrate is configured to transition from a strained configuration to a fractured configuration at a specified temperature range in which the first substrate end fractures from the second substrate end; and
   a fracture indicator coupled with the shape memory substrate, and the fracture indicator is configured to indicate the fractured configuration.

2. The thermal sensor assembly of claim 1, wherein the fracture indicator includes a conductive fracture indicator coupled between the first and second substrate ends, and the shape memory substrate includes a conductive material.

3. The thermal sensor assembly of claim 1, wherein the fracture indicator includes a mechanical fracture indicator coupled with the shape memory ally, and the mechanical fracture indicator includes a visible flag presented where the shape memory substrate is in the fractured configuration.

4. The thermal sensor assembly of claim 1, wherein the isolation housing includes electrical insulation interposed between the first and second substrate ends and the first and second anchors, respectively.

5. The thermal sensor assembly of claim 1 comprising an equipment housing and the equipment housing includes the brace and the first and second anchors.

6. The thermal sensor assembly of claim 1, wherein the first and second anchors include opposed jaws engaged with the first and second substrate ends, respectively.

7. The thermal sensor assembly of claim 1, wherein the shape memory substrate is a nickel-titanium alloy.

8. The thermal sensor assembly of claim 1, wherein the specified temperature range is a single temperature.

9. A thermally sensitive equipment assembly comprising:
an equipment assembly, the equipment assembly includes one or more components configured to operate below a specified temperature range;
a thermal sensor assembly coupled with the equipment assembly including a shape memory substrate including first and second substrate ends, and the shape memory substrate is configured to transition from a strained configuration to a fractured configuration at the specified temperature range; and
wherein the equipment assembly is operable with the shape memory substrate in the strained configuration and inoperable with the shape memory substrate in the fractured configuration.

10. The thermally sensitive equipment assembly of claim 9, wherein the equipment assembly is operable where the shape memory substrate is in the strained configuration.

11. The thermally sensitive equipment assembly of claim 9, wherein the thermal sensor assembly includes a fracture indicator coupled with the shape memory substrate and the equipment assembly, the fracture indicator is configured to detect the configuration of the shape memory substrate, and the equipment assembly is operable according to the configuration detected by the fracture indicator.

12. The thermally sensitive equipment assembly of claim 11, wherein the shape memory substrate is electrically conductive; and
the fracture indicator includes a conductive fracture indicator coupled between the first and second substrate ends, and the conductive fracture indicator includes a closed circuit with the shape memory substrate in the strained configuration and an open circuit with the shape memory substrate in the fractured configuration.

13. The thermally sensitive equipment assembly of claim 12, wherein the conductive fracture indicator is operatively coupled with the equipment assembly, and the equipment assembly is operable according to the shape memory substrate configuration indicated by the closed and open circuits.

14. The thermally sensitive equipment assembly of claim 11, wherein the fracture indicator includes a mechanical fracture indicator, and the mechanical fracture indicator is operatively coupled with the equipment assembly.

15. The thermally sensitive equipment assembly of claim 9, wherein the equipment assembly includes an optical system having a thermoelectric cooling system.

16. The thermally sensitive equipment assembly of claim 9, wherein the equipment assembly includes a rocket venting system.

17. The thermally sensitive equipment assembly of claim 9, wherein the specified temperature range is a single temperature.

18. A method for making a thermal sensor comprising:
straining a shape memory substrate into a strained configuration, the shape memory substrate including first and second substrate ends, and the shape memory substrate is configured to transition from the strained configuration to the fractured configuration at a specified temperature range;
securing the first and second substrate ends with the shape memory substrate in the strained configuration, the first substrate end is static relative to the second substrate end; and
coupling a fracture indicator with the shape memory substrate, the fracture indicator is configured to indicate a fracture of the shape memory substrate between the first and second substrate ends.

19. The method of claim 18, wherein securing the first and second substrate ends includes securing the first and second substrate ends with first and second anchors, respectively.

20. The method of claim 19, wherein securing the first and second substrate ends includes coupling a brace between the first and second anchors.

21. The method of claim 18, wherein coupling the fracture indicator includes coupling a conductive fracture indicator between the first and second substrate ends where the shape memory substrate is conductive.

22. The method of claim 18, wherein coupling the fracture indicator includes coupling a mechanical fracture indicator with the shape memory substrate, and the mechanical fracture indicator includes one or more of a visible or audible indicator presented where the shape memory substrate is fractured.

23. The method of claim 18, wherein straining the shape memory substrate into the strained configuration includes straining the shape memory substrate in a martensitic phase.

24. The method of claim 23, comprising cooling the shape memory substrate from an austenitic phase to the martensitic phase.

* * * * *